United States Patent [19]

Dobson, Jr. et al.

[11] Patent Number: 5,616,541

[45] Date of Patent: Apr. 1, 1997

[54] LOW SOLIDS, HIGH DENSITY FLUIDS FOR WELL DRILLING

[75] Inventors: James W. Dobson, Jr., Houston; Terry D. Robertson, Kingwood; Kenneth B. Mondshine, Houston, all of Tex.

[73] Assignee: Texas United Chemical Company, LLC., Houston, Tex.

[21] Appl. No.: 386,443

[22] Filed: Feb. 10, 1995

[51] Int. Cl.$^6$ .............................. C08B 11/20; C09K 3/00; C09K 7/02; E21B 43/00

[52] U.S. Cl. ........................ 507/145; 507/271; 507/111

[58] Field of Search ................................. 507/271, 145; 252/8.55 R, 8.551

[56] References Cited

U.S. PATENT DOCUMENTS

| | | | |
|---|---|---|---|
| 3,762,485 | 10/1973 | Chesser et al. | 166/305 R |
| 4,175,042 | 11/1979 | Mondshine | 252/8.55 R |
| 4,427,556 | 1/1984 | House et al. | 252/8.5 A |
| 4,435,564 | 6/1984 | House | 536/87 |
| 4,822,500 | 4/1989 | Dobson et al. | 252/8.551 |
| 5,283,235 | 2/1994 | Bush et al. | 507/118 |

Primary Examiner—David B. Springer
Attorney, Agent, or Firm—Roy F. House

[57] ABSTRACT

Disclosed are low solids, high density fluids useful as drilling, workover, and completion fluids and the like in oil and gas well operations. The fluids comprise one or more brines having a density greater than about 1500 kg/m$^3$, a viscosifier which is a high surface area silica, a fluid loss control additive which is preferably a starch derivative, one or more water soluble or acid soluble bridging agents, and, optionally, an alkaline buffer and a polar additive.

Also disclosed is an additive for the preparation of low solids, high density fluids which comprises a fumed silica and a bridging agent in a weight ratio of bridging agent to fumed silica from about 2 to about 20, and optionally, an alkaline buffer in a weight ratio of alkaline buffer to fumed silica from about 0.03 to about 2.5.

14 Claims, No Drawings

LOW SOLIDS, HIGH DENSITY FLUIDS FOR WELL DRILLING

BACKGROUND OF THE INVENTION the drilling of well bores penetrating subterranean formations, drilling fluids are generally circulated through the well bores to remove cuttings therefrom and accomplish other purposes. Most drilling fluids are comprised of suspended particles of hydrated clay in water and weighting materials such as barite are frequently combined with the drilling fluids to increase the densities thereof. Various additives are also commonly utilized in drilling fluids to impart desired properties thereto, such as to bring about low fluid loss from the drilling fluids to subterranean formations in contact therewith. However, once a well bore penetrates a subterranean formation containing desired hydrocarbon fluids, insoluble materials in the drilling fluid such as clay and barite can be damaging to the formation. That is, a filter cake or sheath of such insoluble material can form on the face of the formation and some solids of the filter cake can penetrate into the formation which in turn can result in a permanent reduction in the permeability and hydrocarbon producing ability of the formation.

In order to prevent damage to producing formations during the drilling and completion of well bores penetrating such formations and during subsequently carried out workover procedures, non-damaging brines have heretofore been utilized in lieu of drilling fluids containing insoluble solids. The brines are non-damaging because the salts contained therein which provide density to the brines are dissolved, and no solids are placed in contact with the formation thereby. Because such drilling, completion, and workover brines do not contain undissolved solids, they are commonly referred to as "clear brines."

In operations carried out in well bores penetrating subterranean formations containing fluids under high pressures, the brines utilized must have very high densities, e.g., densities in the rage of from about 9.0 to 21.5 pounds per gallon, in order to prevent the pressurized fluids from blowing out of the wellbore. These brines typically contain KCl, NaCl, $CaCl_2$, NaBr, $CaBr_2$, $ZnCl_2$ and $ZnBr_2$, or combinations of such salts, and are of relatively high cost.

Because of the high cost of high density drilling, completion and workover brines, they are usually recovered, filtered, and reused in well servicing operations. The loss of such brines is expensive and undesirable and as a result, fluid loss reduction procedures and additives have heretofore been utilized with high density brines. These include increasing the viscosity of the brines by combining hydratable viscosifiers therewith such as hydroxyethylcellulose and derivatized polysaccharides. While combining such viscosifiers with high density brines has resulted in the reduction of fluid loss, the disadvantages are that relatively large quantities of the viscosifiers are required, difficulties are often encountered in dissolving and hydrating the viscosifiers in high density brines, especially brines containing zinc bromides; and the viscosity produced is often lost or greatly lessened when the brines are used in relatively high temperature or low pH environments. U.S. Pat. Nos. 4,175,042 and 4,822,500, incorporated herein by reference for all purposes, disclose drilling, workover and completion fluids comprising a saturated brine solution in which a water soluble salt, which is not soluble in the saturated brine, of a particular size range is suspended in the saturated brine along with suitable polymeric viscosity and suspension additives and suitable fluid loss control agents. Representative saturated brines may contain one or more salts such as KCl, NACl, $CaCl_2$, $ZnCl_2$, KBr, NaBr, $CaBr_2$, $ZnBr_2$, $Na_2So_4$, $Na_2CO_3$, $K_2CO_3$, and $NaHCO_3$. Representative water soluble, particulate sized salts are KCl, NaCl, $CaCl_2$, $CaBr_2$, $Na_2SO_4$, $Na_2CO_3$, $K_2CO_3$, and $NaHCO_3$. Representative viscosity and suspension additives are: calcium, chrome, or ferrochrome lignosulfonates; carboxymethylcellulose; and starches such as corn, potato, and tapioca, and their derivatives. U.S. Pat. No. 4,822,500 discloses that xanthan gum and a particular epichlorohydrin crosslinked hydroxypropyl starch synergistically combine in the saturated brine to provide excellent suspension and fluid loss control. Such fluids have been eminently successful, and are a preferred fluid for drilling in hydrocarbon bearing formations, such as in "horizontal drilling."

SUMMARY OF THE INVENTION

It has now been found that low solids, high density fluids having excellent theological and filtration characteristics, and good thermal stability, are provided by the fluids of this invention.

The fluids of this invention comprise a brine, an amorphous silica viscosifier, a fluid loss control additive, and a bridging agent. Optionally, but preferably, the fluids also contain an alkaline buffer and a low molecular weight polar additive as more particularly described herein.

The low solids, high density fluids of this invention are useful as drilling fluids for oil and gas, particularly when drilling into hydrocarbon-containing formations, workover fluids, and completion fluids. The fluids provide excellent filtration properties providing extremely thin filter cakes. This provides more readily removable filter cakes, easier well clean-up, and better hydrocarbon production. The excellent low shear rate viscosity (rheological properties) of the fluids provide excellent suspension and hole cleaning properties.

In another embodiment of the invention, the invention provides an additive for the preparation of fluids useful in oil and gas well operations. The fluid containing a brine having dissolved therein a salt selected from the group consisting of calcium bromide, zinc bromide, and mixtures thereof, and optionally one or more additional water soluble salts, the brine having a density from about 1500 $kg/m^3$ to about 2400 $kg/m^3$, the additive comprising a fumed silica and a bridging agent wherein the weight ratio of bridging agent to fumed silica is from about 2 to about 20, and optionally, an alkaline buffer in a weight ratio of buffer to fumed silica from about 0.03 to about 2.5.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The fluids of this invention comprise an amorphous silica viscosifier, a fluid loss control additive, and a bridging agent dispersed or suspended in a brine (i.e., an aqueous liquid having one or more water soluble salts dissolved therein).

The preferred brine contains a salt selected from the group consisting of calcium bromide, zinc bromide, and mixtures thereof. Such a brine may also contain other water soluble salts dissolved therein. The concentration of calcium bromide, zinc bromide, and other water soluble salt may be any concentration up to saturation in the brine. Generally the density of the brine will be from about 1560 kg/m$^3$ to about 2400 kg/m$^3$(13.0 lbm/gal to 20 lbm/gal). As indicated hereinbefore, such brines are well known in the art. Commercially available are a calcium bromide brine having a density of 1704 kg/m$^3$(14.2 lbm/gal), a calcium bromide/zinc bromide brine having a density of 2304 kg/m$^3$(19.2 lbm/gal), and combinations of these brines with other brines or waiter soluble salts.

The amorphous silica viscosifier, as known and accepted in the art, are derived either by a liquid phase or a vapor process. Silicas obtained by the vapor process are called fumed or pyrogenic silicas. Products obtained by the liquid process are categorized as silica gels and precipitated silicas. Thus, there are three distinct types of synthetic silicas on the market:

1. Pyrogenic Silicas

Pyrogenic or fumed silicas are prepared by reacting silicon tetrachloride vapor with oxygen and hydrogen gas at high temperatures. These products have high external surface areas and differ from other silicas (e.g., gels, precipitated silicas) prepared from the liquid phase process. Cabot and DeGussa are two suppliers of pyrogenic silicas.

2. Silica Gels

Silica gels are of two types: hydrogels and aerogels. Hydrogels are prepared by reacting a soluble silicate such as sodium silicate with strong sulfuric acid. The gel is washed salt free, dried, micronized, and then classified. Aerogels are prepared from crude hydrogels by displacing its water content with an alcohol. The alcohol is then recovered by heating the gel in an autoclave. Aerogels are lighter and fluffier than hydrogels because the shrinkage of the gel structure is avoided during the drying process. Gels have very large surface areas, generally in the range of 300–1,000 m$^2$/g and high porosities. Silica gels are offered, e.g., by W. R. Grace and Company under the trademark "Syloid;" by Monsanto, under the trademark "Santocel;" and by Glidden, under the trademark "Silicron."

3. Precipitated Silicas

Precipitated silicas are produced by the de-stabilization and precipitation of silica from soluble silicate by the addition of a mineral acid and/or acidic gases. The reactants thus include an alkali metal silicate and a mineral acid, such as sulfuric acid or an acidulating agent such as $CO_2$.

When the acidification agent is added to the alkali metal silicate at a certain point during the process, the silica starts precipitating. The addition of the acidification agent is continued until the $M_2O$ of the alkali metal silicate (M being the alkali metal) of the ultimate silica is less than about 1% by weight. Thus, as a general rule, the acidification agent is added to the alkali metal silicate to neutralize the alkali portion bound to the silicate anion. The reaction slurry is filtered and washed free of reaction by-product, which is the alkali metal salt of the acidification agent. The filter cake is dried and milled to obtain a silica of desired degree of fineness.

Silica, to be an effective thickening agent must be of a fine size. By fine size is meant that the silica must be in a particle size range of less than 100 millimicrons. These silica materials may either initially by of this small particle size, or be capable of being easily deaggregated or disintegrated to this small particle size when mixed into the liquid to be thickened. Very useful silica thickeners have generally been produced by pyrogenic techniques. These silicas are the thermal decomposition product of silica tetrachloride. A prime characteristic of these pyrogenic silica materials is that they are loosely aggregated to about a 0.5 to 5 micron size, but which when mixed into a liquid readily deaggregate to less than 100 millimicron sized particles.

Silica thickening agents have also been produced by aerogel processes. Generally these are not as good in thickening liquids as pyrogenic silicas. U.S. Pat. No. 4,216,113 discloses a modified hydrogel process which produces silica thickening agents of a particle size range of 0.5 to 5 micrometers. It is readily deaggregated under conventional mixing to particle sizes of less than 100 millimicrons. A commercially available precipitated silica viscosifier is HI-SIL T-600, a product of Industries, Inc. It has an average ultimate particle size of 21 millimicrons and an average agglomeration size of 1.6 microns (micrometers).

The pyrogenic, fumed silicas are preferred.

Polymeric fluid loss control additives used in well drilling and servicing fluids are so-called water soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

The preferred polymeric fluid loss control additives used in the invention are the starch ether derivatives such as hydroxyethyl starch, hydroxypropyl starch, dihydroxypropyl starch, carboxymethyl starch, hydroxyalkyl carboxymethyl starch, and cationic starches, and the slightly crosslinked derivatives of these starch ethers.

Most preferably the polymeric fluid loss control additive is a starch ether derivative which has been slightly crosslinked, such as with epichlorohydrin, phosphorous oxychloride, soluble trimetaphosphates, linear dicarboxylic acid anhydrides, N,N$^1$-methylenebisacrylamide, and other reagents containing two or more functional groups which are able to react with at least two hydroxyl groups. The preferred crosslinking reagent is epichlorohydrin. Generally the treatment level is from about 0.005% to 0.1% of the starch to give a low degree of crosslinking of about one crosslink per 200 to 1000 anhydroglucose units. The crosslinking may be undertaken before or after the starch is derivatized. Additionally, the starch may be modified by acid or enzyme hydrolysis to provide a lower molecular weight starch polymer for derivatization. Such starch polymers are well known in the art. The book entitled "Modified Starches: Properties and Uses," by O.B. Wurzburg, 1986 (CRC Press, Inc., Boca Raton, Fla. U.S.A.) is an excellent source for information in the preparation of starch derivatives.

The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid. The bridging agent must not be appreciably soluble in the liquid used to prepare the fluid. Representative water soluble salts include sodium chloride, potassium chloride, calcium chloride, sodium formate, potassium formate, sodium bromide, potassium bromide, calcium bromide, sodium acetate, potassium acetate, and the like.

Representative acid soluble materials include calcium carbonate, dolomite (calcium/magnesium carbonate), iron carbonate, and other carbonates. The preferred bridging agents are sodium chloride and calcium carbonate.

The particle size distribution of the bridging agent must be sufficient to bridge across and seal the pores in the subterranean formation contacted by the fluid. Generally, as disclosed in U.S. Pat. No. 4,175,042, a preferred particle size range is from about 5 microns to about 800 microns with greater than about 5% by weight of the particles being coarser than 44 microns. It has been found, however, that the addition of a supplementary bridging agent having a particle size such that at least 90% of the particles thereof are less than 10 microns and the average particle size is from about 3 to about 5 microns decreases the fluid loss of the fluids of this invention and reduces the concentration of polymer required to impart the desired degree of fluid loss control to the fluids of this invention.

When the bridging agent is water soluble, it is preferred that the brine be saturated with respect to the bridging agent, or at least substantially saturated such that less than 10% by weight of the bridging agent is dissolved in the brine. Optionally, but preferably, the fluids of this invention contain an alkaline buffer and a low molecular weight polar additive.

The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like. In accordance with this invention, the fluids should exhibit pH's in the range from about 3.0 to about 8.0. Brines containing zinc bromide should have a pH less than about 6.0 as is well known in the art. Although the actual pH's of highly concentrated salt solutions cannot be accurately read using a pH meter, the relative PH's of several different highly concentrated salt solutions may be accurately compared. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner. Where it is necessary to adjust the measured pH, the adjustment may be carried out at substantially any time in accordance with this invention.

The low molecular weight polar additives useful in this invention have a molecular weight less than about 400 and contain one or more polar groups per molecule selected from the group consisting of hydroxyl, amino, and mixtures thereof. These include alcohols, alkylene glycols, polyalkylene glycols, alkyl ethers of alkylene glycols and polyalkylene glycols, amines, alkylene diamines, polyalkylene polyamines, piperazines, aminoalcohols, and the like. The preferred polar additives have the empirical formula $$HO-C_aH_{2a}-Z$$

where a is an integer from 1 to about 5, and Z is a radical selected from the group consisting of H, and $(OC_bH_{2b})_nOR$, where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5, and y is an integer from 1 to 3. Preferably a=2 or 3, and $Z=(OC_bH_{2b})_nOR$. Thus it is preferred that the water soluble hydroxy-containing polar additive contain at least two hydroxyl groups or at least one hydroxyl and at least one ether group or radical within its molecular structure.

The polar additive may serve several functions in the fluids of this invention. The polar additive may serve to scavenge (react with) dissolved oxygen in the fluids, may serve to bond between the surface hydroxyls on the particles of the silica viscosifier, and may serve to activate or presolvate the polymeric fluid loss control additives in the zinc bromide-containing brines.

The concentrations of the additives in the fluids of this invention are as follows:

|  | Useful Concentrate Range | | Preferred Concentration Range | |
| --- | --- | --- | --- | --- |
|  | kg/m³ | lbm/bbl | kg/m³ | lbm/bbl |
| Silica Viscosifier | 5.7–714 | 2–25 | 5.7–14.3 | 2–5 |
| Fluid Loss Control Additive | 8.5–42.8 | 3–15 | 5.7–14.3 | 5–10 |
| Bridging Agent | 1.43–143 | 5–50 | 28.6–114 | 10–40 |
| Alkaline Buffer | 0–28.6 | 0–10 | 0–14.3 | 0–5 |
| Polar Additive | 0–42.8 | 0–15 | 0–28.6 | 0–10 |

The preferred fluids of this invention are characterized as having a Low Shear Viscosity of at least 3000 centipoise, a Spurt Loss no greater than 2 cubic centimeters, and a thirty (30) minute Fluid Loss less than 10 cubic centimeters. The Low Shear Viscosity (LSV) for purposes of this invention is obtained using a Brookfield Model LVTDV-I viscometer having a number of 2 or 3 spindle at 0.3 revolutions per minute (shear rate of 0.063 sec$^{-1}$). The LSV is indicative of the suspension properties of the fluid, the larger the LSV, the better is the suspension of solids in the fluid. The Spurt Loss and Fluid Loss for purposes of this invention are obtained by a modified API filtration test. Thus to an API high temperature filtration cell with removable end cages is added a screen having 44 micron openings. There is then added 67.5 grams of a sized sand to produce a 1.5 cm sand bed. The sized sand has a particle such that all of the sand passes through a screen having 177 micron openings and is retained on a screen having 125 micron openings. The fluid to be tested is poured along the inside edge of the filtration cell so as not to disturb the sand bed. The filtration test is then conducted for 30 minutes at the desired temperature of 79.4° C. (175° F.) under a pressure differential of 17.59 kg/cm² (250 pounds per square inch) supplied by nitrogen. The spurt loss is measured as the amount of fluid expelled from the filtration cell until the flow of fluid is reduced to drops. The fluid loss is measured as the total amount of fluid collected in 30 minutes.

The fluids of this invention can be prepared by mixing together the brine, fluid loss control additive, silica, bridging agent, alkaline buffer, and polar additive in any order. however, it is preferred that the fluid loss control additive be hydrated in a brine having a density less than about 1560 kg/m³ containing the polar additive, if any. Subsequently, the remaining brine having the density required to obtain a fluid having the desired density, the silica, the bridging agent, the alkaline buffer, if used, and any additional polar additive are mixed together.

As indicated hereinbefore, another embodiment of the invention is to provide an additive for the fluids set forth herein, the additive comprising a fumed silica having an ultimate particle size in the range less than 100 millimicrons and a bridging agent as set forth herein, in a weight ratio of bridging agent to fumed silica from about 2 to about 20. Optionally, the additive may contain an alkaline buffer as disclosed herein in a weight ratio of alkaline buffer to fumed silica from about 0.03 to about 2.5.

The fluids of this invention can thus be prepared preferably by dispersing the fluid loss control additive in a brine having a density less than about 1560 kg/m$^3$ containing the polar additive, if any, adding the remaining brine having the density required to obtain a fluid having the desired density, adding the silica, the alkaline buffer if used and not incorporated into the additive, and any polar additive if used and not incorporated into the brine containing the fluid loss control additive, and mixing thoroughly.

In order to more completely describe the invention, the following nonlimiting examples are given. In these examples and this specification, the following abbreviations may be used: API= American Petroleum Institute; FLCA= fluid loss control additive; PA= polar additive; No.= number; sec.= seconds; min.= minutes; lbm/gal= pounds per U.S. gallon; bbl= 42 gallon barrel; lbm/bbl= pounds per barrel; g.= grams; cc= cubic centimeters; m= meter;° C= degrees Centigrade; lbm/gal=pounds per gallon; %= percent by weight; kg/m$^3$ = kilograms per cubic meter; Tr=Trace; PV= plastic viscosity in centipoise; YP= yield point in pascals; GS=10 second/10 minute gel strengths in pascals; LSV= Brookfield low shear viscosity at 0.3 revolutions per minute, in centipoise.

The plastic viscosity, yield point, and gel strengths were obtained by the procedures set forth in API's Recommended Practice 13 B-1.

Various brines are used in the examples, as follows: Brine I is a 1704 kg/m$^3$ calcium bromide brine containing approximately 51.9 weight % of CaBr$_2$; Brine II is the 1704 kg/m$^3$ CaBr$_2$ brine which has been saturated with sodium chloride; Brine III is a 2304 kg/m$^3$ zinc bromide/calcium bromide brine containing approximately 52.8 weight % of ZnBr$_2$ and 22.8 weight % of CaBr$_2$; Brine IV is a 1524 kg/m$^3$ CaBr$_2$ brine containing approximately 42.9 weight % CaBr$_2$; Brine V is the 1524 kg/m$^3$ CaBr$_2$ brine which has been saturated with sodium chloride.

Four bridging agents have been used in the examples, as follows: Bridging Agent I and Bridging Agent II are sized, particulate sodium chloride having the particle size distribution set forth hereinbelow. Bridging Agent III and Bridging Agent IV are sized calcium carbonate having the particle size distribution set forth hereinbelow.

| BRIDGING AGENTS Particle Size Distribution % of Particles Less Than | | | | | | |
|---|---|---|---|---|---|---|
| No. | 5 μm | 10 μm | 20 μm | 30 μm | 44 μm | 74 μm |
| I | 1 | 6 | 16 | 65 | 90 | 96 |
| II | 62 | 90 | 100 | — | — | — |
| III | 23 | 42 | 66 | 83 | 94 | 98 |
| IV | 60 | 92 | 100 | — | — | — |

EXAMPLE A

Various fluid loss control additives were evaluated for their effect on the low shear rate viscosity and fluid loss control of a 1596 kg/m$^3$ (13.3 lbm/gal) brine as follows: 25 grams of the FLCA were hydrated in 350 cc of Brine V containing 25 cc tripropyleneglycol. Thereafter 227 cc of Brine II were mixed with 100 cc of the FLCA slurry, followed by 4 grams Cab-O-Sil M5 silica, 5 grams MgO, 40 g Bridging Agent No. 1, and 10 g Bridging Agent No.2. The data obtained are given in Table A.

The FLCA evaluated are as follows: No. 1 is a hydroxypropyl ether derivative of an acid treated corn starch which has been slightly crosslinked with epichlorohydrin; No. 2 is a hydroxypropyl ether derivative of corn starch which has been slightly crosslinked with epichlorohydrin; No. 3 is a non-crosslinked hydroxypropyl ether derivative of corn starch; No. 4 is a hydroxypropyl cationic starch ether; No. 5 is a carboxymethyl ether derivative of an acid treated starch; No. 6 is a non-crosslinked hydroxypropyl ether derivative of corn starch; No. 7 is a hydroxypropyl, carboxymethyl mixed starch ether; No. 8 is a non-crosslinked hydroxypropyl starch having a high molar substitution of hydroxypropyl groups; No. 9 is an epichlorohydrin crosslinked hydroxypropyl potato starch; No. 10 is an epichlorohydrin crosslinked mixed hydroxypropyl carboxymethyl derivative of corn starch; No. 11 is an epichlorohydrin crosslinked carboxymethyl ether of potato starch having a high degree of substitution of carboxymethyl groups; No. 12 is a cationic starch; No. 13 is a non-crosslinked carboxymethyl ether of potato starch having a low degree of substitution of carboxymethyl groups; No. 14 is a cationic starch ether.

TABLE A

| Fluid Loss Control Additives Evaluation | | | |
|---|---|---|---|
| FLCA | LSV | Spurt Loss, cc. | Fluid Loss cc. |
| 1 | 92,800 | 0 | 0 |
| 2 | 18,400 | 0 | 3.5 |
| 3 | 134,800 | 0 | 3.5 |
| 4 | 27,700 | 0 | 2.5 |
| 5 | 59,800 | 0 | 3 |
| 6 | 21,300 | Tr | 11 |
| 7 | 23,900 | Tr | 7.5 |
| 8 | 38,800 | 3 | 5 |
| 9 | 46,300 | 3 | 24 |
| 10 | 39,800 | 1.5 | 13.5 |
| 11 | 54,500 | 2 | 7.5 |
| 12 | 68,300 | Tr | 8 |
| 13 | 56,400 | 3 | 7 |
| 14 | 396,000 | 2 | 12 |

EXAMPLE B

Various polar additives were evaluated for their effect on the viscosity of a 1920 kg/m$^3$(16.0 lbm/gal) brine as follows: Procedure A-10 g of FLCA No. 1 (Example A) were mixed in 136 cc of Brine IV to hydrate the FLCA; 181 cc of Brine III were added while mixing followed by 2 g of Cab-O-Sil M5 silica and 5 cc of polar additive, and the fluid mixed 5 minutes using a paddle-type Brookfield mixer; Procedure B - 10 g of FLCA No. 1 (Example A) and 5 cc of polar additive were mixed in 136 cc of Brine IV to hydrate the FLCA; 181 cc of Brine III were added followed by 2 g of Cab-O-Sil M5 silica, and the fluid mixed 5 minutes as above. The LSV obtained for these fluids is as follows:

| Polar Additives | Low Shear Viscosities | |
|---|---|---|
| | Procedure A | Procedure B |
| Tripropylene glycol | 29,700 | 27,600 |
| Ethylene glycol | 42,100 | 25,300 |
| Polyglycolic acid | 36,400 | 36,400 |
| Polyethyleneglycol, MW = 300 | 50,500 | 45,400 |
| Polypropyleneglycol, MW = 230 | 40,900 | 54,000 |
| Methanol | 24,100 | 46,500 |

EXAMPLE C

Low solids, high density fluids having densities from 1596 kg/m³ to 2196 kg/m³ were prepared as follows: Slurries of FLCA No. 1 (Example A) were prepared having the composition set forth in Table C-1; Fluids were prepared by mixing together the brines, FLCA slurry, Cab-O-Sil M5 silica, bridging agents, alkaline buffer, and polar additive set forth in Table C-2. These fluids were evaluated initially and after static aging in an oven at 79.5° C. The data obtained are set forth in Table C-3.

TABLE C-1

Fluid Loss Control Additive (FLCA) Slurries

| Slurry Number | FLCA | g. FLCA | Brine | cc. Brine | Polar Additive (PA) | cc. PA |
|---|---|---|---|---|---|---|
| I | No. 1 | 7.15 | V | 100 | Tripropylene glycol | 25 |
| II | No. 1 | 6 | IV | 150 | None | 0 |
| III | No. 1 | 2.85 | IV | 50 | None | 0 |

TABLE C-2

FLUID COMPOSITIONS

| Fluid | Brine No./cc. | FLCA Slurry No./cc. | g. Silica | Bridging Agents No./g. | | Alkaline Buffer/g. | Polar Additive/g. |
|---|---|---|---|---|---|---|---|
| 1 | I/227 | I/100 | 2 | I/40 | II/10 | MgO/5 | — |
| 2 | I/227 | I/100 | 3 | I/40 | II/10 | MgO/5 | — |
| 3 | I/227 | I/100 | 4 | I/40 | II/10 | MgO/5 | — |
| 4 | I/77 III/100 | II/150 | 2 | III/20 | IV/5 | None/0 | None/0 |
| 5 | I/77 III/100 | II/150 | 2 | III/20 | IV/5 | ZnO/10 | None/0 |
| 6 | I/77 III/100 | II/150 | 2 | III/20 | IV/5 | MgO/0.25 | PEG*/3 |
| 7 | III/222 | II/105 | 2 | III/15 | IV/5 | ** | None/0 |
| 8 | III/277 | III/50 | 4 | III/10 | IV/5 | Lime/5 | None/0 |

*PEG = Polyethyleneglycol, MW = 300
** 2.5 g. each of MgO and Lime

TABLE C-3

PROPERTIES OF FLUIDS

| Fluid Number | Density kg/m³ | Hours Aged @ 79.5° C. | Rheological Properties | | | | Filtration Properties | | |
|---|---|---|---|---|---|---|---|---|---|
| | | | PV | YP | GS 10 sec./10 min. | LSV | Spurt Loss cc. | Fluid Loss cc. | pH |
| 1 | 1596 | 0 | 37 | 10.5 | 1.9/4.3 | 10,100 | 0 | 0 | 7.75 |
| 1 | 1596 | 16 | 46 | 8.6 | 1.9/3.8 | 13,200 | — | — | — |
| 2 | 1596 | 0 | 53 | 15.4 | 2.9/11 | 21,900 | 0 | 1.5 | 7.7 |
| 2 | 1596 | 16 | 49 | 18.2 | 3.8/7.7 | 47,500 | 0 | 1.5 | — |
| 3 | 1596 | 0 | 48 | 16.3 | 2.9/8.6 | 57,200 | Tr | 2.5 | 7.6 |
| 3 | 1596 | 16 | 62 | 21.1 | 6.7/13.9 | 60,600 | 0 | 9 | — |
| 4 | 1824 | 0 | 30 | 9.1 | 2.4/3.4 | 16,900 | Tr | 6 | 5.05 |
| 4 | 1824 | 16 | 34 | 10.1 | 2.4/2.9 | 13,700 | 0 | 0 | 4.80 |
| 5 | 1824 | 0 | 35 | 9.6 | 2.9/3.4 | 20,900 | Tr | 2.5 | 5.1 |
| 5 | 1824 | 16 | 37 | 9.1 | 2.4/2.9 | 16,800 | Tr | 1.5 | 5.15 |
| 6 | 1824 | 0 | 34 | 9.6 | 2.4/2.9 | 16,700 | 1.5 | 6 | 4.80 |
| 6 | 1824 | 16 | 45 | 12 | 3.4/3.8 | 18,300 | 0 | 0 | 5.7 |
| 7 | 2064 | 0 | 48 | 12 | 3.4/3.8 | 18,200 | 0 | 5.5 | 3.95 |
| 7 | 2064 | 16 | 68 | 16.3 | 3.8/3.8 | 46,800 | 0 | 4 | 4.25 |
| 8 | 2196 | 0 | 64 | 13.4 | 2.4/4.8 | 23,800 | Tr | 3 | 3.15 |
| 8 | 2196 | 16 | 135 | 14.4 | 3.4/3.8 | 42,800 | Tr | 3.5 | 3.80 |

What is claim is:

1. In a fluid useful in various downhole oil and gas well operations which comprises a brine having dissolved therein a salt selected from the group consisting of calcium bromide, zinc bromide, and mixtures thereof, and, optionally, one or more additional water soluble salts, the brine having a density from about 1500 kg/m$^3$ to about 2400 kg/m$^3$, a viscosifier, a fluid loss control additive, and a bridging agent selected from the group consisting of water soluble, particulate salts which are not appreciably soluble in the brine, acid soluble materials, and mixtures thereof, the improvement wherein the viscosifier comprises silica having an ultimate particle size less than 100 millimicrons in an amount to provide the fluid with a low shear rate viscosity of at least 3000 centipoise.

2. The fluid of claim 1 wherein the fluid loss control additive is selected from the group consisting of starch derivatives, cellulose derivatives, lignocellulose derivatives, and mixtures thereof.

3. The fluid of claim 2 wherein the fluid loss control additive is a starch ether derivative.

4. The fluid of claim 2 wherein the fluid loss control additive is a starch ether derivative selected from the group consisting of hydroxyethyl starch, hydroxypropyl starch, dihydroxypropyl starch, carboxymethyl starch, hydroxyalkyl carboxymethyl starch, cationic starch, and the slightly crosslinked derivatives thereof having about one crosslink per 200 to 1000 anhydroglucose units in the starch derivative, and mixtures thereof.

5. The fluid of claim 4 wherein the starch ether derivative is derived from a starch which has been modified by acid or enzyme hydrolysis to decrease the molecular weight of the starch.

6. The fluid of claim 3, 4, or 5 wherein the fluid contains from about 5.7 to about 71.4 kg/m$^3$ of the silica viscosifier, from about 8.5–42.8 kg/m$^3$ of the fluid loss control additive, from about 14.3 to about 143 kg/m$^3$ of the bridging agent, from 0 to about 28.6 kg/m$^3$ of an alkaline buffer, and from 0 to about 42.8 kg/m$^3$ of a polar additive.

7. The fluid of claim 1, 3, 4, or 5 wherein the silica is a fumed silica.

8. The fluid of claim 6 wherein the silica is a fumed silica.

9. The fluid of claim 6 wherein the silica is a fumed silica, and wherein the bridging agent is selected from the group consisting of sodium chloride, calcium carbonate, and mixtures thereof.

10. The fluid of claim 6 wherein the silica is fumed silica, wherein the bridging agent is selected from the group consisting of sodium chloride, calcium carbonate, and mixtures thereof, wherein the alkaline buffer is selected from the group consisting of magnesium oxide, magnesium hydroxide, calcium oxide, calcium hydroxide, zinc oxide, zinc hydroxide, and mixtures thereof, and wherein the polar additive has the empirical formula HO—$C_aH_{2a}$—Z, where a is an integer from 1 to about 5, and Z is a radical selected from the group consisting of H and $(OC_bH_{2b})_nOR$, where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5, and y is an integer from 1 to 3.

11. A fluid useful in various downhole oil and gas well operations which comprises a brine having dissolved therein a salt selected from the group consisting of calcium bromide, zinc bromide, and mixtures thereof, and optionally, one or more additional water soluble salts, the brine having a density from about 1500 kg/m$^3$ to about 2400 kg/m$^3$, wherein the improvement comprises a silica viscosifier having an ultimate particle size less than 100 millimicrons in an amount sufficient to provide the fluid with a low shear rate viscosity of at least 3000 centipoise.

12. The fluid of claim 11 which additionally comprises a fluid loss control additive therein.

13. The fluid of claim 12 which additionally comprises a bridging agent therein.

14. The fluid of claim 12 which additionally comprises an alkaline buffer therein.

* * * * *